United States Patent Office 3,047,537
Patented July 31, 1962

3,047,537
EPOXY RESIN COMPOSITION
Bobby Legler, Lake Jackson, Tex., assignor to The Dow Chemical Company, Midland, Mich., a corporation of Delaware
No Drawing. Filed June 25, 1959, Ser. No. 822,732
4 Claims. (Cl. 260—47)

This invention relates to permanently thermoplastic epoxy resin molding compounds and to a method for the production thereof.

Commercial epoxy resins employed as molding compounds are polymers of varying molecular weight (in the range of 350 to 800) produced, in general, by the condensation reaction between epichlorohydrin and bisphenol A in a caustic medium. The importance of epoxy resins to the molding art is due to the thermoset polymers obtained upon curing with a polyamine. However, hexamethylenetetramine (hereinafter referred to as HMTA) is not generally used in this curing since the thermoset polymers obtained therewith contain crystalline HMTA and assume a hygroscopic nature.

While the above epoxy molding compositions have been used successfully, definite limitations, such as short shelf life, long mold cycle, and loss of material in the case of mold rejects, are present.

It is an object of this invention to prepare a new permanently thermoplastic epoxy molding compound. It is a further object to prepare a thermoplastic epoxy molding compound with indefinite shelf life. Further objects will become apparent hereinafter.

It has now been discovered that when an epoxy ether condensation polymer having the following structure.

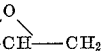

wherein $n$ is a number from 0 to about 25 and R represents a divalent hydrocarbon radical of a dihydric phenol, is reacted with an excess of HMTA at a temperature between 24° C. to 100° C. at atmospheric pressure, a permanently thermoplastic product is obtained. The reaction will occur between 24 to 100° C., but it is generally preferred to operate between 50 and 80° since above 100° the product decomposes while below 24° the reaction rate is very slow. Excellent results are obtained with from about 1 to 10 parts by weight epoxy resin per 1 part by weight HMTA. As the amount of epoxy resin to HMTA increases from about 1 part by weight epoxy resin to 1 part by weight HMTA up to about 10 parts by weight epoxy resin to 1 part by weight HMTA, the properties of the polymer tend toward a thermosetting composition. When a large excess of HMTA is used, it is not detrimental to the polymer but presents a removal problem.

Though HMTA is not generally used in curing epoxy resins, it is used as the curing agent for another group of thermosetting resins. These are the phenolformaldehyde resins, or phenolics. Broadly, this includes phenol-aldehyde resins and plastics and resinous products of coal tar origin, such as those produced from cresol, xylenol, resorcinol, and related products. Commercially, two general types of reactions are employed involving different ratios of formaldehyde to phenol with acid or alkaline catalyst. In either case, phenolic alcohols are obtained in the initial formaldehyde-phenol reaction and by controlling reactants and reaction time, resins of many properties are obtained.

The initial phenolic alcohols formed are known as resols or A-stage resins and are fusible or soluble in alkalies. Resols can be cured, on heating, to infusible, insoluble products. Further condensation produces resitols or B-stage resins of which the molecular weights are of such magnitude that the resins are no longer soluble in alkalies but can be softened by heating. Resites, or C-stage resins, represent the final stage of polymerization and are relatively insoluble and infusible. If a ratio of less than one mole of formaldehyde to one mole phenol is used initially with an acid actalyst, the resultant resin is a permanently fusible novolak. Novolaks are converted under heat and pressure, if desired, to insoluble, infusible products by HMTA.

Handling properties as well as physical properties of cured epoxy resins are directly dependent on the curing agent employed and the art teaches it is very important to use the stoichiometric amount of amine. This presents a problem when molding with epoxy resins in that the resin and curing agent are kept in separate containers. Before molding, the correct stoichiometric amount of curing agent is blended into the resin (usually liquid) and the catalyzed mixture used shortly thereafter. Curing is carried out at ambient temperatures or in an oven and should there be an error, the resin cures to an infusible, insoluble mass with undesirable properties. The result is a loss of starting materials.

As an alternate method, a B-stage epoxy resin is sometimes used and in the case of a solid resin and solid curing agent, a premixed molding composition can be prepared. Here again, the amount of curing agent is critical, but is more easily controlled in the premixing. The disadvantage, aside from the critical amount of curing agent, is that the premixed molding composition may set-up or partially cure while in storage with the result that the starting materials are lost.

However, when using either of the above methods, the epoxy resin, once cured, is an insoluble, infusible composition. Due to this thermosetting characteristic, another disadvantage is encountered when a molded product is rejected due to imperfections resulting at the mold. The cured, molded product is insoluble; it cannot be remelted; and again the result is a loss of starting materials.

When the thermoplastic epoxy resin molding compounds produced by this invention are used, there is no critical measurement of curing agent with which to contend. Initially, the epoxy resin was reacted with an excess of HMTA and no further addition of curing agent is required. These epoxy resin molding compounds can be molded at a temperature of from 250° to 350° F. and if an imperfection results at the mold, the molded product can be remelted and remolded. There is no loss of starting materials as in the case of molding with a thermosetting compound.

These thermoplastic epoxy resin molding compositions are not only useful for standard molding operations, but they may also be used in vacuum molding. Various fillers, such as asbestos, wood flour, alpha-cellulose, etc., dyes and pigments may be incorporated with these compositions.

In order that those skilled in the art may better understand how the present invention may be practiced, the following examples are given by way of illustration and not by way of limitation.

*Example I*

Into a 2-liter reaction flask, equipped with a means for stirring and heating, was charged a mixture consisting of 100 grams hexamethylenetetramine, 500 grams of methanol and 125 grams of water. The temperature of the flask was raised to 60° C. and 100 grams of epoxy resin, obtained by reacting 1 mole of bisphenol A with 10 moles of epichlorohydrin and 2.04 moles of NaOH, and 500 grams of xylene was added thereto over a 2½ hour period. Upon completion of this addition, the temperature was raised to 80° C. and maintained for 2½ hours. At the end of 2½ hours a gel-like product was obtained, which, after washing and drying, was a free-flowing thermoplastic powder.

The powder was molded at a temperature of from 250 to 350° F. to an easily machinable product with a Rockwell M-80 hardness. It was then melted and remolded as with any thermoplastic material. A sample of the molding powder was stored for longer than 24 months, after which it was molded, remelted, and again molded. There was no change in molding properties.

*Example II*

Into a 2-liter reaction flask, equipped with a means for stirring and heating, was charged a mixture consisting of 56 grams of hexamethylenetetramine dissolved in 100 mls. of water. The temperature of the flask was raised to 60° C. and 80 grams of epoxy resin, prepared as in Example I, dissolved in 100 mls. of xylene was added thereto over a 30-minute period. Upon completion of this addition, the temperature was raised to 93° and maintained for 2 hours. At the end of 2 hours a gel-liked product was obtained, which after washing and drying, was a free flowing thermosplastic powder. The powder was molded at a temperature of from 250 to 350° F. It was then remelted and remolded as with any thermoplastic material.

*Example III*

Into a 2-liter reaction flask, equipped with a means for stirring and heating, was charged a mixture consisting of 28 grams of hexamethylenetetramine dissolved in 65 grams of xylene. The temperature of the flask was raised to 60° C. and 80 grams of epoxy resin, prepared as in Example I, dissolved in 65 grams of xylene was added thereto over a 30-minute period. Upon completion of this addition, the temperature was raised to 90° and maintained for 2 hours. At the end of two hours a gel-like product was obtained, which, after washing and drying, was a free flowing thermoplastic powder. The powder was molded at a temperature of from 250 to 350° F. It was then remelted and remolded as with any thermoplastic material.

*Example IV*

Into a 2-liter reaction flask, equipped with a means for stirring and heating, was charged a mixture consisting of 14 grams of hexamethylenetetramine dissolved in 10 grams of water. The temperature of the flask was raised to 60° C. and 80 grams of epoxy resin, prepared as in Example I, dissolved in 400 grams of xylene, was added thereto over a 30-minute period. Upon completion of this addition, the temperature was raised to 90° and maintained for 2 hours. At the end of two hours a gel-like product was obtained, which, after washing and drying, was a free-flowing thermoplastic powder. The powder was molded at a temperature of from 250 to 350° F. It was then remelted and remolded as with any thermoplastic material.

While it is necessary to use an excess of HMTA, the excess amount employed is not critical or detrimental to the product but where a large excess is used, it presents a removal problem. When 1 part by weight epoxy resin to 1 part by weight HMTA is used, the HMTA is in comparatively large excess since the reaction depends on the ratio of the number of epoxy equivalents to the number of HMTA equivalents. Epoxy equivalents can be based on the available epoxy groups and HMTA equivalents can be based on the available active hydrogens present in HMTA. For this calculation, it is assumed that HMTA reacts as $4NH_3 + 6CH_2O$, and that, each mole contains 8 available hydrogen atoms which can be utilized without causing cross-linkage and yielding a thermosetting product. As the amount of epoxy resin to HMTA increases toward a 10 per 1 ratio, the product gradually tends toward thermosetting properties. Beyond the 10 per 1 ratio to a ratio of 20 parts by weight epoxy resin to 1 part by weight HMTA, the product is thermosetting. An epoxy resin having an epoxy equivalent of about 1.5 to 2.2 can be cured in the above-described manner to form permanently thermoplastic resins similar to those illustrated above.

This is a continuation-in-part of my copending application Serial No. 747,489, filed July 11, 1958, now abandoned.

I claim:

1. A process for producing permanently thermoplastic epoxy resin molding compositions which comprises reacting at a temperature of about 24° to 100° C. a mixture consisting essentially of an epoxy resin of the structure

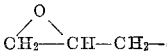

wherein $n$ is a number from 0 to 25 and R is a divalent hydrocarbon radical of a dihydric phenol, with hexamethylenetetramine wherein the weight ratio of epoxy resin to hexamethylenetetramine is from about 1/1 to about 10/1.

2. A process as defined in claim 1 wherein the temperature is from 50° to 80° C.

3. A composition of matter comprising an epoxy resin and hexamethylenetetramine having a molding temperature of between 250° and 350° F. said epoxy resin having the formula

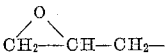

wherein $n$ is a number from 0 to 25 and R is a divalent hydrocarbon radical of a dihydric phenol.

4. A permanently thermoplastic epoxy resin molding composition, consisting essentially of a mixture of an epoxy resin having an epoxy equivalent of about 1.5 to 2.2 and, as a curing agent therefor, at least about 0.125 mole of hexamethylenetetramine per epoxy equivalent of the epoxy resin said epoxy resin having the formula

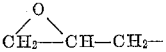

wherein $n$ is a number from 0 to 25 and R is a divalent hydrocarbon radical of a dihydric phenol.

References Cited in the file of this patent

UNITED STATES PATENTS 2,569,920    Buck et al. _____ Oct. 2, 1951

FOREIGN PATENTS 124,849    Sweden _____ May 10, 1949
629,111    Great Britain _____ Sept. 13, 1949

OTHER REFERENCES

Lee et al.: "Epoxy Resins," pages 229–230, McGraw-Hill Publishers, New York, N. Y. (1957). (Copy in Sci. Libr.)

UNITED STATES PATENT OFFICE

CERTIFICATE OF CORRECTION

Patent No. 3,047,537                            July 31, 1962

Bobby Legler

It is hereby certified that error appears in the above numbered patent requiring correction and that the said Letters Patent should read as corrected below.

Column 3, line 18, for "100" read -- 1000 --.

Signed and sealed this 19th day of February 1963.

(SEAL)
Attest:

ESTON G. JOHNSON
Attesting Officer

DAVID L. LADD
Commissioner of Patents